June 2, 1959 P. J. ENDEBAK ET AL 2,889,009
AIR LINE LUBRICATORS
Filed June 6, 1956 3 Sheets-Sheet 1

INVENTORS
Warren R. Tucker
Peter J. Endebak
Gilbert Riske
By Ooms, McDougall, Williams & Hersh
Attorneys

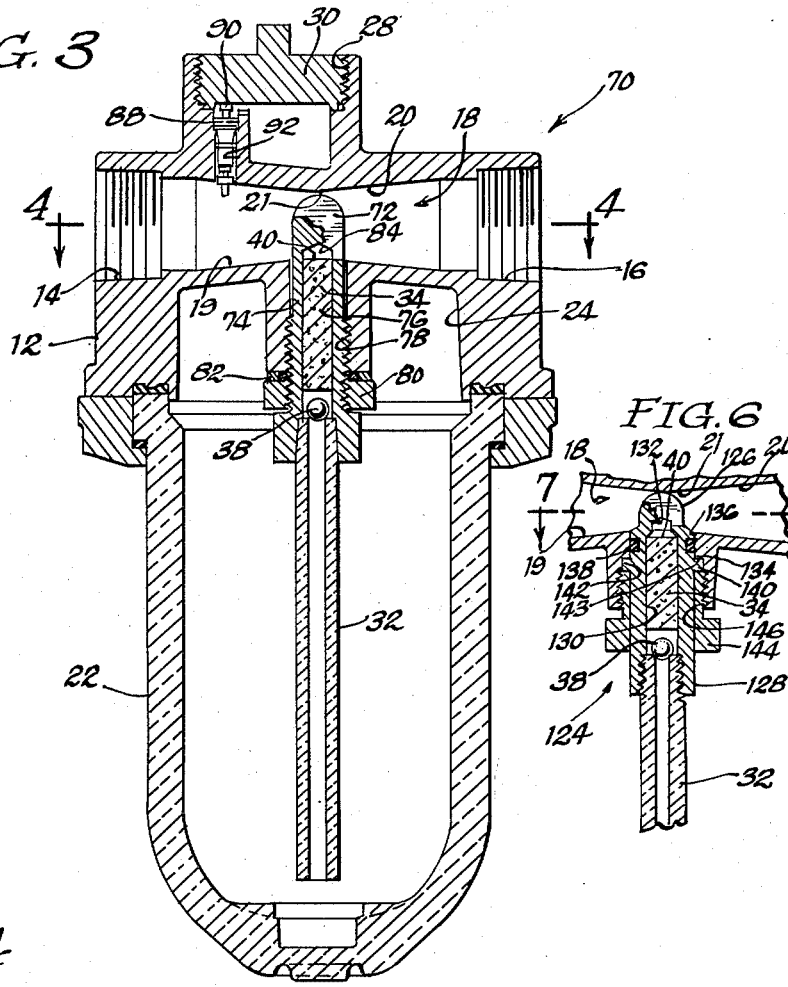
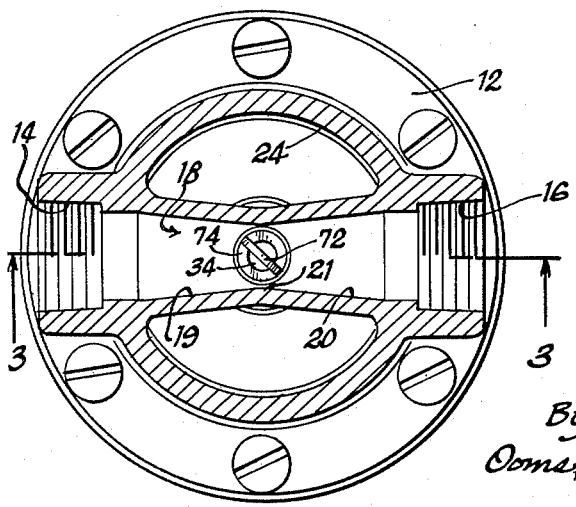
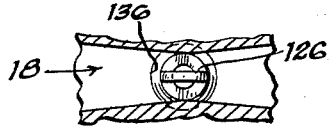

June 2, 1959 P. J. ENDEBAK ET AL 2,889,009
AIR LINE LUBRICATORS
Filed June 6, 1956 3 Sheets-Sheet 3
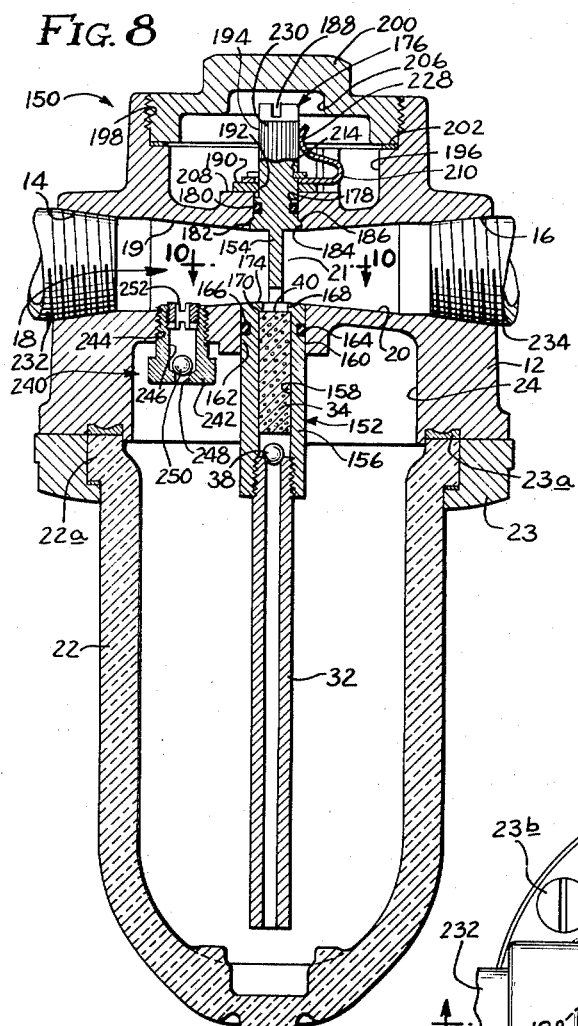
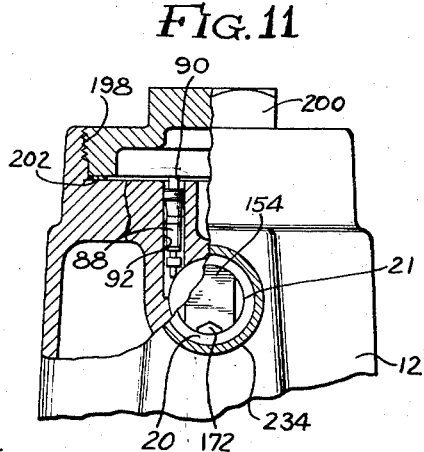
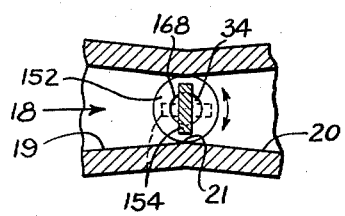
INVENTORS:
Warren R. Tucker
Peter J. Endebak
Gilbert Riske
By: Ooms, McDougall, Williams & Hersh
Attorneys

United States Patent Office 2,889,009
Patented June 2, 1959

2,889,009

AIR LINE LUBRICATORS

Peter J. Endebak, La Grange, and Gilbert Riske, Chicago, Ill., and Warren R. Tucker, Tuscaloosa, Ala., assignors to Parker-Hannifin Corporation, a corporation of Ohio Application June 6, 1956, Serial No. 589,755

8 Claims. (Cl. 184—55)

This invention relates to new and improved lubricators of the type adapted to be inserted in an air line or pipe so as to introduce oil mist, fog or spray into the air carried by the line and thereby lubricate any device operated by the air or connected to the air line.

This application is a continuation-in-part of our copending application, Serial No. 502,476, filed April 19, 1955, and now abandoned.

One principal object of the invention is to provide new and improved air line lubricators having means for readily adjusting the quantity of oil introduced into the air line.

A further object is to provide new and improved air line lubricators of the foregoing character having means whereby the oil introduction rate may be varied from either the inside or the outside of the lubricators as desired.

Another object is to provide new and improved air line lubricators in which oil is introduced into the air line through a porous flow-metering member by differential air pressure, and in which the rate of oil introduction is regulated by varying the pressure differential.

It is another object to provide new and improved air line lubricators of the foregoing character which are effective and dependable yet are simple in construction and low in cost.

Further objects and advantages of the invention will appear from the following description, taken with the accompanying drawings, in which:

Fig. 3 is a central vertical sectional view, taken generally along a line 3—3 in Fig. 4 of a second illustrative air line lubricator.

Fig. 4 is a plan view, partly in section along a line 4—4 in Fig. 3.

Fig. 6 is a fragmentary, central vertical, sectional view of a modified lubricator, similar to that of Figs. 3 and 4.

Fig. 7 is a fragmentary horizontal section, taken generally along a line 7—7 in Fig. 6.

Fig. 8 is a central vertical sectional view of another modified air line lubricator, the view being taken generally along a line 8—8 in Fig. 9.

Fig. 9 is a top view of the lubricator of Fig. 8, with the filler plug removed.

Fig. 10 is a fragmentary horizontal sectional view, taken generally along a line 10—10 in Fig. 8.

Fig. 11 is a side elevational view of the lubricator of Fig. 8, partly in section, generally along a line 11—11 in Fig. 9.

Figures 1, 2, 5:
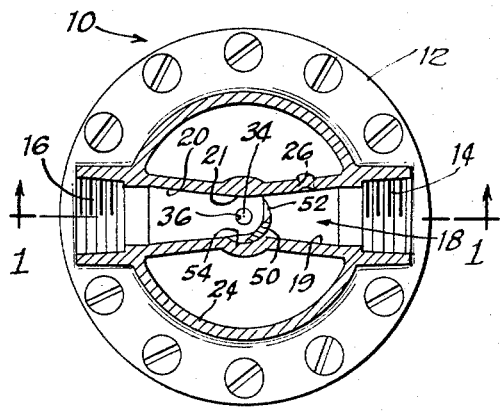
Figure 1 is a central vertical sectional view, taken generally along a line 1—1 in Fig. 2, of an exemplary air line lubricator constituting one illustrative embodiment of the invention.
Fig. 2 is a plan view, partly in section, along a line 2—2 in Fig. 1.
Fig. 5 is a central vertical sectional view of a third illustrative air line lubricator.

If Figs. 1 and 2 of the drawings are considered in greater detail, it will be seen that they illustrate an exemplary air line lubricator 10 adapted to be inserted in an air line or supply pipe so as to introduce finely divided particles of oil into the air carried by the air line. In this way, any device supplied with or operated by the air is lubricated.

In order that the lubricator 10 may be installed in an air line, the lubricator is formed with a body 12 having internally threaded inlet and outlet openings 14 and 16 adapted to receive the threaded ends of pipe sections. A passage 18 extends in the body 12 between the openings 14 and 16. In this instance, the passage 18 is of the venturi type and hence is provided with a convergent entrance section 19 and a divergent exit section 20, with a reduced or restricted venturi throat 21 therebetween. It will be understood that the pressure at the throat 21 is reduced, relative to that at the inlet opening 14, whenever air flows through the venturi passage 18. The differential air pressure between the inlet 14 and the throat 21 is utilized to introduce oil into the passage 18, as will become clear shortly.

A supply of oil is adapted to be contained in a bowl-shaped receptacle or reservoir 22 detachably mounted on the lower end of the body 12. In this instance the bowl 22 has a flanged upper edge 22a which is adapted to be clamped against the underside of the body 12 by a ring 23. A gasket 23a is interposed between the bowl 22 and the body 12. The ring 23 is removably secured to the body 12 by means of a plurality of screws 23b which extend through a flange 23c on the body 12 and are threaded into the ring 23. The receptacle or bowl 22 may be made of transparent plastic material or glass so that the oil level in the bowl will be visible. It will be seen that the upper end of the bowl communicates with a downwardly opening cavity 24 formed in the lower end of the body 12. In effect, this cavity 24 forms part of the receptacle 22.

Communication is established between the inlet opening 14 and the interior of the coil reservoir 22 by means of a restricted orifice 26. In this way, the inlet air pressure is applied to the surface of the oil in the reservoir 22. In this instance, the orifice 26 takes the form of a slit formed in the wall of the venturi passage 18, adjacent the inlet opening 14. The slit 26 extends between the entrance section 19 of the venturi passage and the cavity 24.

Oil may be poured into the oil receptacle 22 through a filler opening 28 which is normally closed by a removable plug 30. Since the slit 26 affords only very limited communication between the inlet opening 14 and the cavity 24, the plug 30 may be removed even when substantial air pressure exists at the inlet opening 14. The restriction afforded by the slit 26 prevents any substantial loss of air through the filler opening 28.

Oil is carried from the receptacle or bowl 22 into the passage 18 through a tube or conduit 32 and thence through a porous flow-metering plug or member 34, which is preferably made of sintered metal, but may be made of felt or other fibrous material. It will be seen that the porous plug 34 is mounted in a vertical bore 36 extending downwardly from the venturi passage 18 at the throat 21. The porous plug 34 may be fitted tightly enough into the bore 36 to prevent displacement of the plug and leakage of oil between the plug and the bore. In order to carry oil to the lower end of the plug 34, the tube 32 extends downwardly from the lower end of the bore 36 into the receptacle 22. Return flow of oil in a downward direction through the tube 32 is prevented by a ball-type check valve 38 which is freely positioned in the bore 36 between the tube 32 and the plug 34, and hence is adapted to be seated over the upper end of the tube 32. It will be seen that the porous plug 34 does not extend into the venturi passage 18, and hence does not afford any restriction to the flow of air through the passage. Only the upper end of the plug 34 is exposed to the air stream flowing through the passage 18. The illustrated plug 36 is rod-shaped or generally cylindrical in form, and is provided with a flat upper surface 40 which is substantially flush with the wall of the passage 18, at the throat 21.

When air flows through the venturi passage 18, a pressure differential is set up between the inlet opening 14 and the throat 21. This pressure differential forces oil up the tube 32, past the check valve 38 and through the length of the porous plug 34. It will be understood that the porous plug 34 greatly restricts the flow of oil and thereby acts as a flow-metering element. The oil reaching the upper surface 40 of the plug 34 is blown, in finely divided form into the exit section 20 of the venturi passage 18.

In order to regulate the rate at which oil is introduced into the air stream, the lubricator 10 is arranged so that the pressure differential between the inlet opening 14 and the top of the plug 34 may be varied. Such variation is effected by means of a member 42 which is movable in the body 12, adjacent, but independent of the porous plug 34, the plug actually being immovable in this case. It will be seen that the movable flow regulating member 42 comprises a cylindrical shaft or body member 44 which is rotatable in a bore 46 extending upwardly in the body 12 from the throat portion 21 of the venturi passage 18. The bore overlies and is axially aligned with the porous plug 34. A sealing ring 48 is interposed between the shaft 44 and the bore 46 to prevent loss of air through the bore.

The differential air pressure is regulated by means of an eccentric vane 50 which depends from the shaft 44. It will be seen that the vane 50 is movable in an arcuate path extending from a point adjacent one side of the throat 21 to a point in the center of the entrance section 19, adjacent the throat 21. The lower end of the vane 50 is received in an arcuate groove or track 52 extending along this arcuate path. When the vane 50 is in its first-mentioned position along the side of the throat 21, the vane fits into an arcuate recess 54 and, in effect, merely forms a portion of the passage wall. Thus the vane 50 offers a minimum of restriction to air flow through the venturi throat 21. Accordingly, the pressure differential due to the venturi effect is at a minimum.

When the vane 50 is swung into its second-mentioned position, in the center of the entrance section 19 adjacent the throat 21 the vane is disposed broadside in the venturi passage between the inlet opening 14 and the porous plug 34.

Accordingly, the vane affords a maximum of restriction and hence enhances the venturi effect and increases the pressure differential to the maximum possible extent. By moving the vane between its first and second-mentioned positions, the oil introduction rate can be increased to a considerable extent.

In order that the position of the vane 50 may be adjusted from the outside of the lubricator 10, the shaft 44 is formed with a threaded stem 56 which extends upwardly out of the bore 46. A kerf or screwdriver slot 58 is formed in the upper end of the stem 56.

The shaft 44 is retained in the bore 46 against upward movement by means of a split snap ring 60. The flow regulating member 42 may be clamped in adjusted position by means of a lock nut 62 which is threaded onto the stem 56. Washers 63 and 64 are interposed between the lock nut 62 and the body 12. It will be seen that the washer 64 extends across the upper end of the bore 46.

Figs. 3 and 4 illustrate a modified air line lubricator 70, constituting a second illustrative embodiment of the invention. Insofar as the second embodiment is similar to the first embodiment of Figs. 1 and 2, the same reference characters have been inserted in the drawings. Generally, the modified lubricator 70 of Figs. 3 and 4 is the same as the first embodiment of Figs. 1 and 2 except that the externally adjustable vane 50 is replaced by an internally adjustable vane 72 of modified construction. It will be seen that the vane 72 is formed on the upper end of a bushing 74 having a bore 76 which receives the porous metal flow-metering plug 34 with a press fit. In this instance, the bushing 74 is made rotatably adjustable by being threadedly received in a vertical bore 78 extending downwardly in the lubricator body 12 between the venturi throat portion 21 and the cavity 24.

In order that the bushing 74 may be locked in any desired position of rotary adjustment, a lock nut 80 is threadedly received on the lower end portion of the bushing and is adapted to be clamped against the lower side of the lubricator body 12. A combination sealing and locking washer 82 is interposed between the nut 80 and the body 12. It will be seen that the oil carrying tube 32 has its upper end received within the bore 76, formed in the bushing 74.

As illustrated, the vane 72 is flat and platelike in form and is arranged to extend diametrically of the bushing 74, in overlying relation to the porous plug 34. An opening 84 extends through the lower end of the vane 72 immediately above the porous plug 34. In this way, air can flow through the vane so as to sweep lubricant off the upper end surface 40 of the plug 34.

In dimension, the vane 72 is substantially smaller than the venturi throat 21 so that the vane does not offer undue restriction to the flow of air, even when the vane extends broadside across the throat 21. However, the vane affords sufficient restriction to enhance the venturi effect and thereby increase the pressure differential between the inlet opening 14 and the top surface 40 of the porous plug 34.

By rotating the bushing 74 the vane may be moved between its position of minimum restriction, with the vane edgewise to the air stream, and its position of maximum restriction, with the vane extending broadside across the throat 21. By thus rotating the vane, the oil introduction rate may be varied between minimum and maximum values. In Fig. 4, the vane 72 is shown in a diagonal position affording an intermediate rate of oil introduction into the air stream.

In the modified embodiment of Figs. 3 and 4, communication is afforded between the inlet opening 14 and the interior of the oil reservoir 22 by means of a valve 88, which replaces the slit 26 of the first embodiment. In itself, the valve 88 forms no part of the present invention, but is disclosed and claimed in the Maha Patent No. 2,702,094, issued February 15, 1955, to the assignee of of the present invention.

Briefly, however, the valve 88 is arranged to afford communication between the inlet opening 14 and the oil reservoir 22 when the filler plug 30 is in place. The valve 88 acts automatically to cut off such communication when the filler plug is removed from the filler opening 28. In this case, the valve 88 takes the form of a conventional tire valve core, of the type commonly employed in the valve stems of pneumatic tires. Thus, the valve 88 is provided with an upwardly spring-biased valve-operating plunger 90, adapted to be depressed by the filler plug 30 when in place in the opening 28. The valve 88 is threadedly received in a vertical bore 92 extending between the cavity 24 and the entrance portion 19 of the venturi passage 18. When the filler plug 30 depresses the valve-operating plunger 90, communication is afforded between the inlet opening 14 and the cavity 24. Removal of the filler plug 30 permits the spring-biased valve 88 to close, so as to cut off such communication. Thus, the filler plug 30 may be removed without shutting off the air, inasmuch as the valve 88 prevents any loss of air. Moreover, the pressure in the lubricator is vented by leakage around the filler plug 30, as the plug is unscrewed from the opening 28. Accordingly, there is no pressure to cause forcible ejection of the filler plug.

Fig. 5 illustrates another modified lubricator 94, constituting a third illustrative embodiment of the invention.

Here again, the same reference characters have been employed as in Figs. 1 and 2 insofar as the first and third lubricators 10 and 94 are the same.

In the lubricator 94 of Fig. 5, the rate at which oil is introduced into the air stream is varied by means of a movable member in the form of a plunger 96, which replaces the vanes 50 and 72 of the first two embodiments. It will be seen that the plunger 96 is movable radially into the venturi throat 21, along a bore 98 formed in the lubricator body 12. In this instance, the bore 98 extends upwardly from the throat 21, in axially aligned relation to the porous plug 34. To prevent leakage of air between the plunger 96 and the bore 98, a sealing ring 100 is interposed between the bore and an enlarged head 102 formed on the upper end of the plunger. At its lower end, the plunger 96 is guided by an inwardly projecting annular flange 104 formed at the lower end of the bore 98.

In the illustrated embodiment of Fig. 5, the flow-adjusting plunger 96 is biased upwardly by means of a coiled compression spring 106, disposed around the plunger 96, between the flange 104 and the head 102. A split snap ring 108 serves as a stop at the upper end of the bore 98 to limit upward movement of the plunger 96.

When the plunger 96 is in its outwardly biased position, as shown in Fig. 5, the plunger affords a minimum of restriction to the flow of air through the venturi throat 21. In this position of the plunger, the rate at which oil is introduced into the air stream is also at a minimum. The oil introduction rate may be increased by moving the plunger 96 into the throat 21, as indicated in dotted lines in Fig. 5. Such movement of the plunger 96 increases the pressure differential between the interior of the oil reservoir 22 and the top surface 40 of the porous plug 34.

In order to move the plunger 96 into the throat 21, the lubricator 94 is equipped with an adjusting screw 110. In this instance, the screw 110 is threadedly received in an axial bore 112 formed in a special filler plug 114, which replaces the filler plug 30 of the first two embodiments. It will be seen that the filler plug 114 is threadedly received in a filler opening 116 formed centrally in the upper end of the lubricatory body 12. As in the first two embodiments, the filler opening 116 communicates with the cavity 24. The filler plug 114 is adapted to operate the valve 88, as in the second embodiment of Figs. 3 and 4, so as to afford communication between the inlet opening 14 and the cavity 24, when the filler plug is in place.

It will be seen that the adjusting screw 110 is disposed in axially aligned overlying relation to the plunger 96 when the filler plug 114 is in place in the lubricator 94. The lower end of the screw 110 is adapted to push the plunger 96 downwardly into the venturi throat 21. The screw 110 may be locked in any desired position of adjustment by means of a lock nut 118. In this instance, the lock nut 118 is threadedly mounted on the lower end portion of the screw 110 and is engageable with the lower side of the filler plug 144, with the result that the filler plug must be removed to change the setting of the screw 110. This arrangement tends to prevent unauthorized tampering with the setting of the adjusting screw 110. In order that the setting of the screw will be visible from the outside of the lubricator 94, the screw is formed with an unthreaded upper end portion 120 which is visible through an enlarged upper end portion 122 of the bore 112. The position of the screw 110 may thus be checked by observation, or even more conveniently by inserting a measuring rod into the bore 22. To prevent leakage of air around the screw 110, a sealing ring 124 is interposed between the screw and the bore 112.

Figs. 6 and 7 show a fourth lubricator 124a which is similar to that of Figs. 3 and 4. Thus, the lubricator 124a comprises a regulating vane 126 which is carried on the upper end of a rotatable bushing 128. The porous, flow-metering plug or restriction 34 is tightly fitted into a bore 130 formed in the bushing 128. It will be seen that the vane 126 extends upwardly into the throat portion 21 of the venturi 18. An aperture 132 is formed through the vane 126 just above the porous plug 34, so as to expose the upper end surface 40 thereof to the action of the air stream.

The bushing 128 has an upper cylindrical end portion 134 which is rotatably received in a bore 136, extending downwardly from the venturi throat 21. The end portion 134 is grooved to receive a sealing ring 138, which prevents leakage of air between the bushing 128 and the bore 136.

To retain the bushing 128 against upward movement, an annular ridge or shoulder element 140 is formed thereon, immediately below the upper end portion 134, and is received within an enlarged counterbore 142, extending downwardly from the bore 136. A downwardly facing shoulder 143 is formed at the junction of the bore 136 with the counterbore 142. A locking sleeve 144 is slidably received over the bushing 128 below the ridge 140 and is threadedly engaged with the counterbore 142, which has an internally threaded lower portion 146. It will be understood that the locking sleeve 144 may be screwed upwardly so as to clamp the annular ridge 140 against the shoulder 143 at the upper end of the counterbore 142. In this way the bushing 128 and its vane portion 126 may be locked in any desired position of rotary adjustment.

To adjust the vane 126, the locking sleeve 144 is loosened slightly, and the bushing 128 is rotated to bring the vane to the desired angular position. Then the sleeve 144 is retightened to maintain the adjustment.

Figs. 8–11 illustrate another modified lubricator 150 of highly advantageous construction. In many respects, the lubricator 150 is similar to the lubricators of Figs. 1–7. To the extent that such similarity exists, the same reference characters have been used in Figs. 8–11 as in Figs. 1–7. Thus, the pertinent portion of the preceding description may readily be read on Figs. 8–11, and need not be repeated.

In the lubricator 150 of Figs. 8–11, the porous flow restricting member or plug 34 is carried by a member 152 which also has a portion 154 adapted to provide a regulating vane. More specifically, the member 152 has a tubular lower portion 156 formed with a vertical, longitudinal bore 158 which receives the porous metering plug 34. The plug 34 may be press fitted into the bore 158. It will be seen that the oil supply pipe or tube 32 is threaded into the lower end of the bore 158. The check valve ball 38 is disposed in the bore 158, between the lower end of the plug 34 and the upper end of the pipe 32. As in the other embodiments, the ball 38 is adapted to close off the upper end of the pipe and thereby prevent reverse flow of oil through the pipe. In this way, the oil is maintained in contact with the lower end of the plug 34, even when the lubricator is out of service.

In the lubricator 150, the tubular lower portion 156 of the member 152 has a cylindrical outer surface 160 which is rotatably received in a vertical bore 162, extending downwardly in the body 12 from the restricted portion or throat 21 of the air passage 18. At its lower end, the bore 162 communicates with the cavity 24 in the body 12. It will be recalled that the cavity 24 overlies the interior of the oil bowl 22. To prevent leakage of air between the bore 162 and the member 152, a sealing ring 164, of rubber or other soft resilient material, may be interposed between the bore and the member 152. In this instance, the sealing ring 164 is seated in an annular groove 166 formed in the member 162.

The upper end of the bore 158 in the member 152 narrows down into a reduced portion 168 which extends upwardly and opens into the throat or restricted portion 21 of the venturi passage 18. It will be seen that the upper end of the porous metering plug 34 is seated against a shoulder 170 which is formed between the main portion of the bore 158 and the reduced upper portion 168. Thus, the shoulder 170 definitely locates the plug 34 and obviates any possibility of upward displacement of the plug beyond its normal position.

As already indicated, the vane 154 is formed integrally with the member 152 which supports the plug 34. It will be seen from Figs. 8, 10 and 11 that the vane 154 is flat and plate-like in form. It is vertically disposed in the throat 21 of the venturi passage 18 and is substantially narrower in width than the width or diameter of the throat. The member 152 is rotatable, as already indicated, so as to shift the angular position of the vane 154 in the restricted throat 21. In Figs. 8, 10 and 11, the vane 154 is shown in full lines in a position such that it affords the maximum possible restriction to flow of air through the venturi throat 21. In this position, the vane 154 extends crosswise across the throat 21, broadside to the air stream. When the vane 154 is thus positioned, the venturi effect is at a maximum. Thus, the lowest obtainable pressure exists at the restricted throat 21. Accordingly, the differential pressure between the inlet 14 and the throat 21 is at a maximum. As in the embodiments of Figs. 3–7, the inlet pressure is applied to the interior of the oil reservoir 22 through the valve 88. Thus, the differential pressure forces the oil up the tube 32 and through the porous plug 34 at a maximum rate.

The member 152 is rotatable to bring the vane 154 into the position shown in dotted lines in Fig. 10. In this position the vane 154 is feathered or axially disposed in the venturi throat 21, with the result that the venturi action is at a minimum. Thus, the differential pressure across the porous metering plug 34 is at a minimum, with the result that a minimum amount of oil is forced through the plug into the venturi throat 21. It will be understood that the vane 154 may be adjusted to any intermediate position to vary the rate of oil flow between the minimum and maximum values.

An opening 172 is formed through the vane 154 immediately above the porous metering plug 34, so that the air can readily sweep across the upper end of the plug 34. In this instance, the opening 172 is actually an upward extension of the bore 168 which overlies the flat upper end surface 40 of the plug 34. The sweeping action of the air atomizes the oil that is forced through the plug by the differential air pressure. Thus the oil is carried out of the lubricator in the air stream as a fine mist or fog.

There is no need for the porous plug 40 to extend into the air passage 18. In fact, in the illustrated construction, the top of the plug 34 is definitely recessed or receded out of the air passage 18. It would also be possible to make the upper end of the porous plug 34 flush with the air passage, as in the embodiments of Figs. 1–7. In the lubricator 150 of Figs. 8–11, the tubular lower portion 156 of the member 152 has an upper surface 174 which is substantially flush with the lower wall of the throat 21.

To provide for rotary adjustment of the member 152, a stem or shaft portion 176 is arranged to extend upwardly from the vane 154. It will be seen that the shaft 176 is integral with the member 152. The shaft 176 is rotatably received in a bore 178 which extends upwardly from the venturi throat 21 and is vertically aligned with the bore 162. A sealing ring 180 is interposed between the bore 178 and the shaft 176 to prevent leakage of air therebetween.

Just above the vane 154, the shaft 176 has an enlarged lower end portion 182 which is received in an enlarged lower portion 184 of the bore 178. A shoulder 186 is formed on the body 12 between the enlarged portion 184 and the main portion of the bore 178. It will be seen that the enlarged portion 182 of the shaft 176 engages the shoulder 186. Thus, the shoulder 186 definitely locates the shaft 176 and retains the entire member 152 against upward movement.

To facilitate rotary adjustment of the member 152, a screwdriver slot 188, or some other suitable tool-receiving formation, is formed in the upper end of the shaft 176. In order to define the limits of rotary adjustment of the member 152, the shaft 176 is provided with an indicating element 190 which is rotatable therewith. More specifically, the illustrated indicating element 190 takes the form of a disk received on the upper end of the shaft. In order that the disk may be constrained to rotate with the shaft 176, the upper end of the shaft is made non-circular in cross section, and the disk 190 is formed with an opening 192 of corresponding, non-circular shape. More specifically, the illustrated shaft 176 is formed with a flat 194 extending along one side of its upper end. The opening 192 has a complementary flat so that the disk 190 will be keyed to the shaft 176.

It will be seen that the upper end of the shaft 176 extends upwardly into a cavity 196 formed in the top of the body 12. The upper end of the cavity 196 has an enlarged, internally threaded portion 198 adapted to receive an externally threaded filler plug 200. A gasket 202 is adapted to be interposed between the body 12 and the filler plug 200. As in the embodiments of Figs. 3–7, the filler plug 200 is arranged to operate the valve 88 which controls communication between the inlet opening 14 and the interior of the oil reservoir 22. Screwing the filler plug 200 into and out of the opening 198 is effective to open and close the valve 88, as described previously. The cavity 196 is connected to the interior of the oil reservoir 22 through a pair of openings 204 formed in the body 12. Thus, oil may be poured into the oil reservoir 22 through the opening 198. In this instance, the filler plug 200 has a cavity 206 on its underside, to afford clearance for the upper end of the shaft 176.

As shown, the lower side of the indicating disk 190 engages a flat, upwardly facing surface 208 formed in the cavity 196 around the bore 178. A flat apertured spring 210 is seated against the upper side of the indicating disk 190. To retain the member 152 against downward movement, a flat C-clip 212 is mounted on the shaft 176 above the spring 210. It will be seen that the shaft 176 is formed with an annular groove 214 adapted to receive the C-clip 212.

To define the limits of rotary adjustment of the shaft 176, the indicating disk 190 is formed with one or more stop elements which are engageable with complementary stops on the body 12. More specifically, the illustrated disk 190 has a pair of diametrically opposite, outwardly extending arms or tabs 216 and 218. Two spaced stops 220 and 222 are arranged to project inwardly on the body 12, for engagement by the tabs 216 and 218. In this way, the range of movement of the shaft 176 is limited to approximately 90 degrees.

For the purpose of indicating the position of the adjusting shaft 176, graduations 224 are provided on the indicating disk 190. To cooperate with the graduations 224, a pointer or mark 226 is provided on the body 12, adjacent the indicating disk 190. It will be seen that the legends "HI" and "LO" are marked on the disk 190 adjacent the opposite ends of the series of graduations, to indicate the direction in which the shaft 176 should be rotated to provide high or low flow of oil. It will be understood that the graduations might be placed on the body, and the pointer might then be placed on the disk.

In the illustrated lubricator 150, the spring 210 affords frictional resistance to rotation of the shaft 176, so that the position of the shaft will not be changed accidentally, by the force of the air stream, by vibration or otherwise. Thus, the spring 210 is bent upwardly and inwardly toward the shaft 176, and is provided with a curved shoe portion 228 which engages the shaft. It will be seen that the shaft 176 has a milled or knurled portion 230 which is engaged by the shoe 228 to increase the friction between the shoe and the shaft. In this instance, the spring 210 extends between the stops 220 and 222 and thereby is held against rotation.

In Figs. 8, 9 and 11, inlet and outlet pipes 232 and 234 are shown mounted in the inlet and outlet openings 14 and 16. The outlet pipe 234 is shown in cross section in Fig. 11.

In the operation of all of the embodiments, the air flowing in the air line, to which the lubricator is connected, passes through the venturi passage 18 between the inlet and outlet openings 15 and 16. Due to the well known venturi action, the pressure at the throat 21 is somewhat less than that at the inlet opening 14. This pressure differential is applied between the interior of the oil reservoir 22 and the upper end surface 40 of the porous metal flow-metering plug 34. The inlet pressure is applied to the interior of the oil reservoir 22 through the slit 26, in the embodiment of Figs. 1 and 2, and through the valve 88 in the embodiments of Figs. 3–11.

In each of the embodiments, the pressure differential forces oil up the tube 32, past the check valve 38, and through the porous plug 34. The plug 34 greatly restricts the flow of oil and thus acts as a metering element.

In each embodiment, a member is movable in the venturi throat 21 to vary the venturi effect by providing a variable restriction to the flow of air. In this way, the movable member is effective to adjust the pressure differential tending to force the oil through the porous plug 34. It will be understood that the variation in the differential pressure causes a corresponding variation in the oil introduction rate.

In the embodiment of Figs. 1 and 2, the eccentric, arcuately movable vane 50 serves as the movable member to vary the differential pressure and thereby regulate the oil introduction rate. The vane 50 is movable along an arcuate path between a position of minimum restriction, with the vane flush with one side of the venturi throat 21, and a position of maximum restriction with the vane disposed broadside to the air stream, adjacent the porous plug 34. In the latter position, the vane 50 is disposed between the porous plug and the inlet opening 14. The vane 50 may be adjusted from outside the lubricator by loosening the lock nut 62 and rotating the stem 56 with a screw driver or other suitable tool. The lock nut 62 may then be tightened to maintain the adjustment.

In the second embodiment of Figs. 3 and 4, the vane 72 serves as the movable flow-regulating member. In this case, the vane 72 is adjustable by rotating the bushing 74. In order to gain access to the bushing 74, it is necessary to remove the oil bowl 22. This may readily be done, but the arrangement of Fig. 3 does tend to prevent unauthorized tampering with the setting of the lubricator. By rotating the bushing 74, the vane 72 may be shifted between a position of minimum oil flow, with the vane extending in the direction of air flow in the venturi throat 21, and a position of maximum oil flow, with the vane extending broadside to the air stream.

In the third embodiment of Fig. 5, the plunger 96 serves as the movable flow-regulating member. In this case, the plunger 96 is movable into and out of the throat 21 by adjusting the screw 110. The adjustment may be maintained by tightening the lock nut 118. In the illustrated arrangement it is necessary to remove the filler plug 114 to change the adjustment of the screw 110, inasmuch as the lock nut 118 is engageable with the lower side of the plug. This arrangement tends to prevent tampering with the setting of the lubricator. Since the screw 110 is carried by the plug 114, the plunger 96 is retracted outwardly by the spring 106 whenever the plug 114 is removed from the lubricator. As the plug 114 is screwed into the filler opening 116, the adjusting screw 110 pushes the plunger 96 downwardly into the throat 21.

In the embodiment of Figs. 6 and 7, the vane 126 constitutes the movable member for regulating oil flow. When the vane 126 is positioned transversely in the throat 21, the oil introduction rate is at a maximum. For a minimum oil introduction rate, the vane 126 is feathered relative to the air flow. The vane 126 may be adjusted by removing the oil bowl, loosening the threaded locking sleeve 144, rotating the bushing 128, and re-tightening the sleeve 144.

In the embodiment of Figs. 8–11, the vane 154 constitutes the movable member for regulating oil flow. When the vane 154 is positioned transversely in the throat or restricted portion 21 of the air passage 18, the rate at which oil is introduced into the air stream is at a maximum. For a minimum oil introduction rate, the vane 154 is feathered relative to the air flow. Any intermediate rate of oil flow may be obtained by adjusting the vane 154 to the corresponding intermediate position. It will be recalled that the position of the vane governs the differential air pressure due to the venturi action. It is this differential pressure which forces the oil through the porous metering plug 34 and into the air stream. Thus, moving the vane varies the differential air pressure and thereby controls the oil introduction rate.

The vane 154 may be adjusted by removing the filler plug 200 and rotating the shaft 176 with a screwdriver or some other suitable tool. The spring 210 prevents accidental movement of the shaft 176. An indication of the position of the vane 154 is given by the graduated disk 190, which rotates with the shaft 176. The tabs 216 and 218 on the disk 190 cooperate with the fixed stops 220 and 222 to limit the range of rotary adjustment of the shaft 176.

The adjusting shaft 176 is concealed by the filler plug 200 when the lubricator 150 is in normal operation. This tends to discourage unauthorized persons from tampering with the setting of the lubricator.

It is a simple matter to disassemble the lubricator 150 if the porous plug 34 needs to be cleaned or replaced, or if any other servicing is needed. The entire lubricator can be disassembled without removing the body 12 from the inlet and outlet pipes 232 and 234. This is done by first removing the filler plug 200 and the oil bowl 22. The entire rotatable member 152, and all of the components carried thereby, may then be removed from the lubricator, simply by disconnecting the C-clip 212 from the shaft 176. The member 152 may then be withdrawn downwardly. It will be seen that the lower portion 156 of the member 152 is made larger than the vane 154 and the shaft 176 so that the vane and shaft will readily pass through the bore 162. If the porous plug 34 needs to be replaced for any reason, it is generally most convenient to replace the entire assembly comprising the plug and the member 152.

The lubricator 150 may be reassembled by slipping the member 152 upwardly through the bore 162 and into its normal position. The indicating disk 190, the spring 210, and the C-clip 212 are then mounted successively on the shaft 176. The filler plug 200 and the oil bowl 22 may then be remounted on the lubricator body 12. It will be understood that the valve 88 may readily be removed and replaced, if necessary.

It will be apparent that the illustrated lubricators provide precise control over the oil introduction rate. The control arrangements are effective yet simple and low in cost. Moreover, means are provided to discourage unauthorized tampering with the setting of the lubricator.

An additional improvement of a highly advantageous but optional character is shown in Fig. 8. This improvement obviates any possibility of excessive injection of oil into the air stream under conditions of pulsating flow. When there are large pulsations in the air flow, the air pressure in the inlet 18 also pulsates to a considerable extent. The pressure in the oil reservoir or bowl 22 tends to follow these pulsations in pressure, but may lag behind, due to the limited flow capacity of the valve 88 between the inlet 18 and the bowl 22. Consequently, the pressure in the bowl 22 may exceed that in the inlet 18 to a considerable extent, during a portion of each cycle of pulsating pressure. This excess pressure in the bowl 22 tends to force additional oil through the restrictor plug 34 and into the air stream.

Such extra injection of oil is largely prevented, in the lubricator 150 of Fig. 8, by the provision of a large one-way or check valve 240 between the bowl 22 and the inlet 18. The valve 240 offers very low restriction to flow of air from the bowl to the inlet, but affords no passage for flow in the reverse direction. Thus, the valve 240 substantially prevents the bowl pressure from exceeding the inlet pressure.

It will be seen that the check valve 240 comprises a tubular body 242 which is threaded into or otherwise retained in a bore 244 extending between the inlet 18 and the cavity 24 in the body 12. The valve body 242 has a bore 246 therethrough with a reduced lower portion 248 which constitutes a valve port. A ball 250 is adapted to seat over the upper end of the port 248 and is biased toward its seated position by gravity. An apertured retainer 252 is mounted in the upper end of the bore 246 to keep the ball 250 in the body 242.

Any excess pressure in the bowl 22 unseats the ball 250 and thus is immediately dissipated to the inlet 18. On the other hand, the check valve 240 does not afford any passage for flow of air between the inlet 18 and the bowl. The sole communication between the inlet 18 and the bowl 22 is still through the valve 88. Thus, when the filler plug 200 is removed, the valve 88 is closed and the inlet pressure holds the ball 250 over the port 248. Accordingly, there is no continuing loss of air through the filler opening.

Various other modifications, alternative constructions and equivalents may be employed without departing from the true spirit and scope of the invention as exemplified in the foregoing description and defined in the following claims:

We claim:

1. In an air line lubricator, the combination comprising a body having an oil receptacle removably mounted thereon, inlet and outlet air openings in said body, an air passage in said body extending between said openings and having a restricted throat, a filler opening in said body and communicating with said oil receptacle, a filler plug removably received in said filler opening, a first bore extending in said body between said oil receptacle and said throat, a second bore aligned with said first bore and extending in said body between said throat and said filler opening, passage means in said body establishing communication between said inlet opening and said oil receptacle for applying inlet air pressure thereto, a member rotatable in said first and second bores and having a lower portion with a passage therein extending between said oil receptacle and said throat, a porous flow restricting plug disposed in said passage with one end of said plug adjacent said throat, a vane on said member and disposed in said throat for rotation between broadside and feathered positions therein for changing the degree of restriction at said throat and thereby varying the differential air pressure between said inlet opening and said throat to regulate the flow of oil through said porous plug and into said throat, and a shaft portion on said member and extending from said vane through said second bore and into said filler opening under said filler plug, said shaft portion being accessible with said filler plug removed from said filler opening, said shaft portion being manually rotatable to change the position of said vane.

2. In an air line lubricator, the combination comprising a body having an oil receptacle removably mounted thereon, inlet and outlet air openings in said body, an air passage in said body extending between said openings and having a restricted throat, a filler opening in said body and communicating with said oil receptacle, a filler plug removably received in said filler opening, a first bore extending in said body between said oil receptacle and said throat, a second bore extending in said body between said throat and said filler opening, passage means in said body establishing communication between said inlet opening and said oil receptacle for applying inlet air pressure thereto, a porous flow-restricting plug mounted in said first bore with one end of said plug adjacent said throat, conduit means extending between said receptacle and the other end of said plug to supply oil thereto, a vane disposed in said throat for rotation therein for changing the degree of restriction at said throat and thereby varying the differential air pressure between said inlet opening and said throat to regulate the flow of oil through said porous plug and into said throat, and a shaft extending from said vane through said second bore and into said filler opening under said filler plug, said shaft being accessible with said filler plug removed from said filler opening, said shaft being manually rotatable to change the position of said vane.

3. In an air line lubricator, the combination comprising means defining a receptacle for holding oil, a body having inlet and outlet openings and a venturi passage extending between said openings, said venturi passage having a restricted throat portion, means establishing communication between said inlet opening and said receptacle, a porous flow-metering member disposed in said body and having one end in communication with said throat portion of said passage, a conduit extending between the opposite end of said porous member and said receptacle, an oil regulating member movable in said throat portion of said passage adjacent said porous member for varying the degree of restriction at said throat portion and thereby changing the pressure differential between said inlet opening and said throat portion to regulate the flow of oil through said porous member, said oil regulating member comprising a tubular member rotatable in said body and having an opening with said porous member disposed therein, a vane mounted on said tubular member and rotatable therewith, said vane being disposed in said throat portion for varying the degree of restriction at said throat portion, a shaft rotatable with said vane and in said body and having an accessible outer end for manually adjusting the position of said vane, said vane being rotatable between broadside and feathered positions in said throat portion, stop means defining limits of rotation for said shaft corresponding to said broadside and feathered positions of said vane, means for indicating the position of said shaft, friction means for retaining said shaft in any adjusted position, said body having a filler opening communicating with said receptacle, and a filler plug disengageably received in said filler opening, said shaft being disposed in said filler opening under said filler plug and being accessible by removing said filler plug.

4. In an air line lubricator, the combination comprising a body having an oil reservoir disengageably received thereon, inlet and outlet openings in said body, an air passage extending in said body between said inlet and outlet openings and having a restricted portion, passage means in said body establishing communication between said inlet opening and said oil reservoir for applying inlet air pressure thereto, a first bore extending in said body between said restricted portion and said oil reservoir, a filler opening in said body and communicating with said oil reservoir, a filler plug removably received in said filler opening, a second bore aligned with said first bore and extending in said body between said restricted portion and said filler opening, a member rotatable in said first and second bores, said member having a tubular lower portion with a third bore therein communicating at one end with said restricted portion, said member having conduit means establishing communication between said oil reservoir and the opposite end of said third bore, a porous flow-metering plug disposed in said third bore and having one end terminating adjacent said restricted portion, said member having a flat plate-like intermediate portion surmounting said tubular lower portion and defining a vane rotatably disposed in said restricted portion for varying the degree of restriction to flow of air therethrough and thereby changing the differential air pressure between said inlet opening and said restricted portion so as to regulate the flow of oil through said porous plug and into said restricted portion, said vane having an opening therethrough overlying said porous plug and communicating with said third bore, said member having an upper shaft portion surmounting said vane and rotatably received in said second bore, said shaft portion extending into said filler opening under said filler plug and being accessible with said filler plug removed from said filler opening, said member and said body having interengageable shoulders retaining said member against movement into said filler opening, retaining means disengageably mounted on said shaft in said filler opening for retaining said member against movement into said oil reservoir, said member being removable from said first and second bores with said last mentioned means disengaged from said shaft.

5. In an air line lubricator, the combination comprising a body having an oil reservoir disengageably received thereon, inlet and outlet openings in said body, an air passage extending in said body between said inlet and outlet openings and having a restricted portion, passage means in said body establishing communication between said inlet opening and said oil reservoir for applying inlet air pressure thereto, a first bore extending in said body between said restricted portion and said oil reservoir, a filler opening in said body and communicating with said oil reservoir, a filler plug removably received in said filler opening, a second bore aligned with said first bore and extending in said body between said restricted portion and said filler opening, a member rotatable in said first and second bores, said member having a tubular lower portion with a third bore therein communicating at one end with said restricted portion, said member having conduit means establishing communication between said oil reservoir and the opposite end of said third bore, a porous flow-metering plug disposed in said third bore and having one end terminating adjacent said restricted portion but recessed therefrom, first and second sealing means between said member and said first and second bores to prevent leakage of air therebetween, said member having a flat plate-like intermediate portion surmounting said tubular lower portion and defining a vane rotatably disposed in said restricted portion for varying the degree of restriction to flow of air therethrough and thereby changing the differential air pressure between said inlet opening and said restricted portion so as to regulate the flow of oil through said porous plug and into said restricted portion, said vane having an opening therethrough overlying said porous plug and communicating with said third bore, said member having an upper shaft portion surmounting said vane and rotatably received in said second bore, said shaft portion extending into said filler opening under said filler plug and being accessible with said filler plug removed from said filler opening, said member and said body having interengageable shoulders retaining said member against movement into said filler opening, retaining means disengageably mounted on said shaft in said filler opening for retaining said member against movement into said oil reservoir, said member being removable from said first and second bores with said last mentioned means disengaged from said shaft, indicating means rotatable with said shaft in said filler opening to indicate the position of said vane, said indicating means and said body having interengageable stop elements thereon restricting said member to rotation between positions with said vane broadside and feathered in said restricted portion, a spring having a first portion rotatably receiving said shaft and a second portion frictionally engaging said shaft for holding said shaft in any adjusted position, said first portion of said spring being retained on said shaft by said retaining means, and means on said body preventing rotation of said spring.

6. In an air line lubricator, the combination comprising a body having means thereon defining a reservoir for holding oil, said body having inlet and outlet openings therein and a venturi passage therebetween with a restricted throat portion, conduit means extending from said reservoir for immersion in the oil therein and leading to said throat portion, means in said conduit means affording restriction to oil flow therethrough, said body having a filler opening leading into said reservoir, a plug removably closing said filler opening, a first valve in said body and providing communication between said inlet opening and said reservoir to apply inlet pressure thereto, said first valve having means operable by said plug to close said valve in response to removal of said plug from said filler opening, and a one-way valve affording substantially free passage for flow of air between said reservoir and said inlet opening while affording no passage for flow of air from said inlet opening into said reservoir, said one-way valve being effective to dissipate any excess pressure in said reservoir with respect to said inlet opening.

7. In an air line lubricator, the combination comprising a body having means thereon defining a reservoir for holding oil, said body having inlet and outlet openings therein and a venturi passage therebetween with a restricted throat portion, conduit means extending from said reservoir for immersion in the oil therein and leading to said throat portion, a porous metal flow restrictor plug in said conduit means affording restriction to oil flow therethrough, said body having a filler opening leading into said reservoir, a filler plug removably closing said filler opening, a first valve in said body and providing communication between said inlet opening and said reservoir to apply inlet pressure thereto, said first valve having means operable by said filler plug to close said valve in response to removal of said filler plug from said filler opening, and a one-way valve affording substantially free passage for flow of air between said reservoir and said inlet opening while affording no passage for flow of air from said inlet opening into said reservoir, said one-way valve being effective to dissipate any excess pressure in said reservoir with respect to said inlet opening.

8. In an air line lubricator, the combination comprising a body having means thereon defining a reservoir for holding oil, said body having inlet and outlet openings therein and a venturi passage therebetween with a restricted throat portion, conduit means extending from said reservoir for immersion in the oil therein and leading to said throat portion, means in said conduit means affording restriction to oil flow therethrough, said body having a filler opening leading into said reservoir, a plug removably closing said filler opening, a first valve in said body and providing communication between said inlet opening and said reservoir to apply inlet pressure thereto, said first valve having means operable by said plug to close said valve in response to removal of said plug from said filler opening, and a one-way valve affording passage for flow of air between said reservoir and said inlet opening while affording no passage for flow of air from said inlet opening into said reservoir, said one-way valve being effective to dissipate excess pressure in said reservoir with respect to said inlet opening.

References Cited in the file of this patent
UNITED STATES PATENTS

| | | |
|---|---|---|
| 2,680,496 | Johnson | June 8, 1954 |
| 2,681,710 | Streicker | June 22, 1954 |
| 2,702,094 | Maha | Feb. 15, 1955 |
| 2,735,512 | Faust | Feb. 21, 1956 |